May 20, 1941.　　F. A. NACHMAN ET AL　　2,242,919
SPRING ASSEMBLY FOR UPHOLSTERY
Filed April 5, 1939　　2 Sheets-Sheet 1
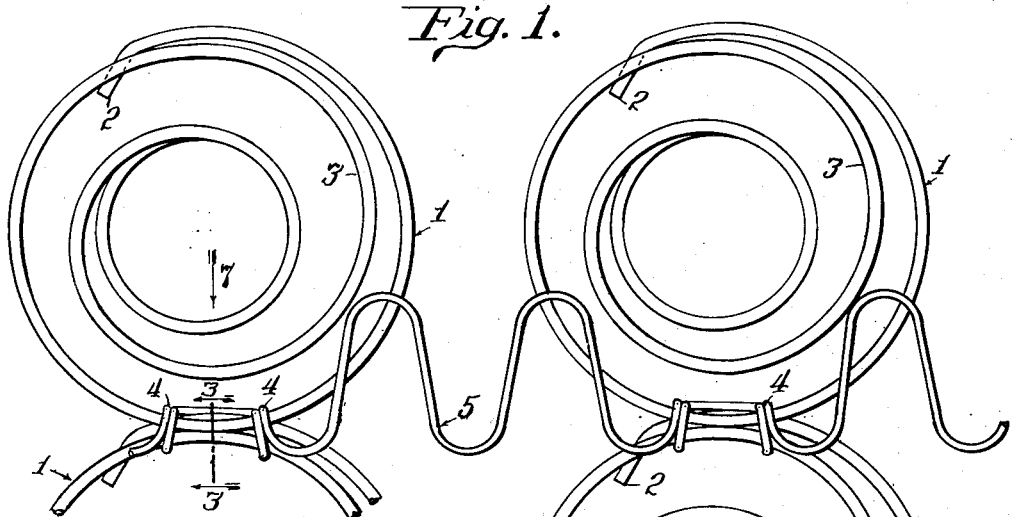
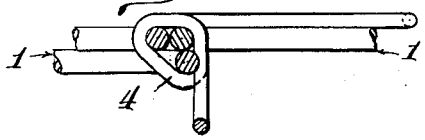
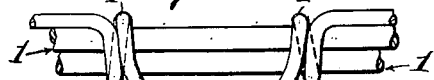
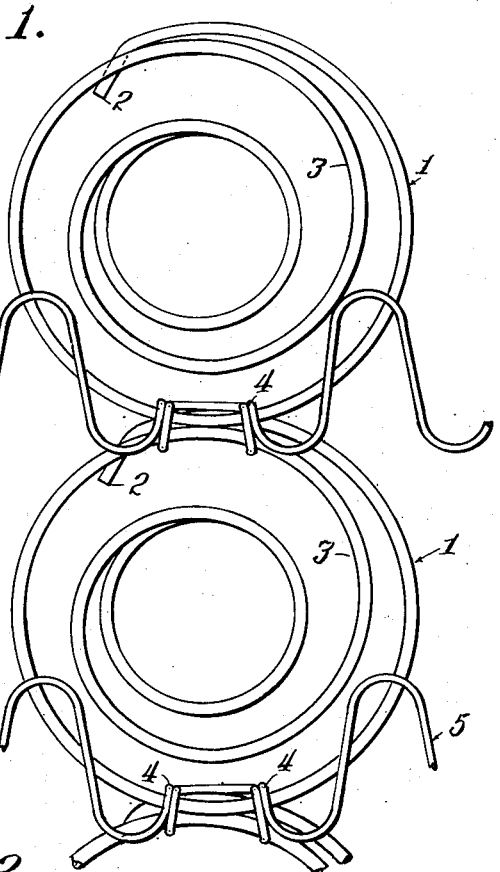
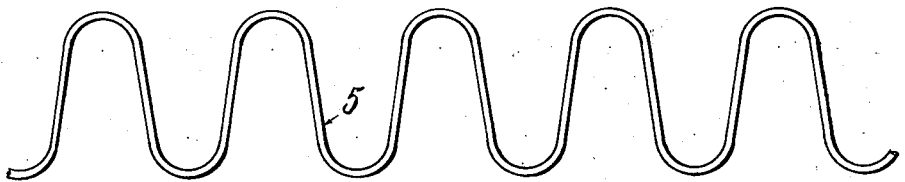
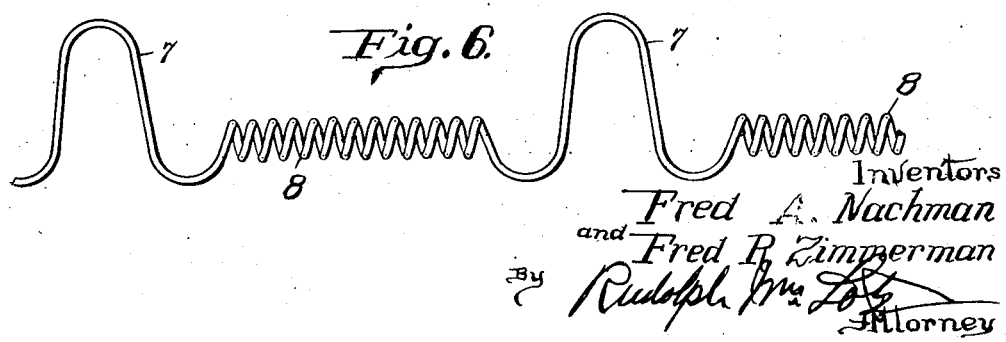
Inventors
Fred A. Nachman
and Fred P. Zimmerman
By Rudolph Wm Lotz
Attorney May 20, 1941.   F. A. NACHMAN ET AL   2,242,919
SPRING ASSEMBLY FOR UPHOLSTERY
Filed April 5, 1939   2 Sheets-Sheet 2
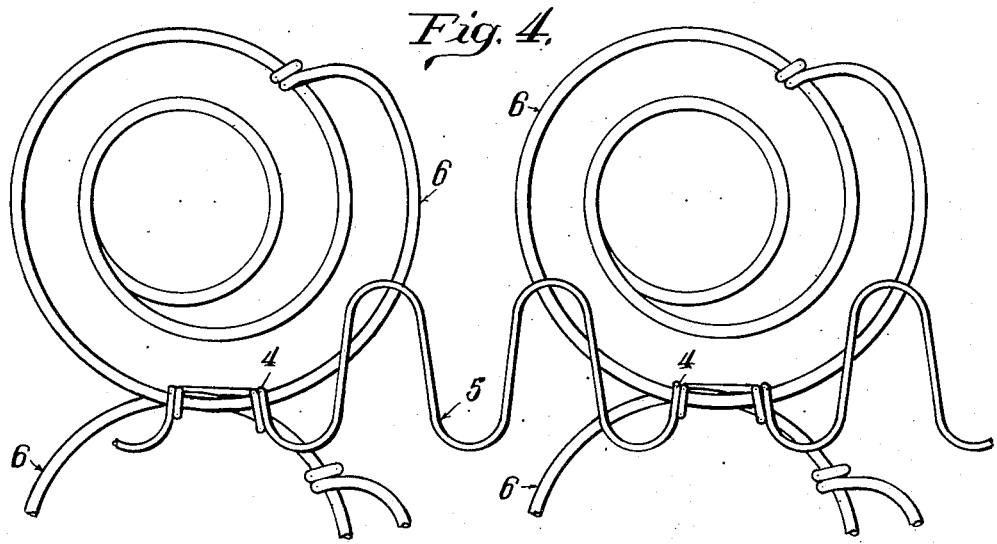
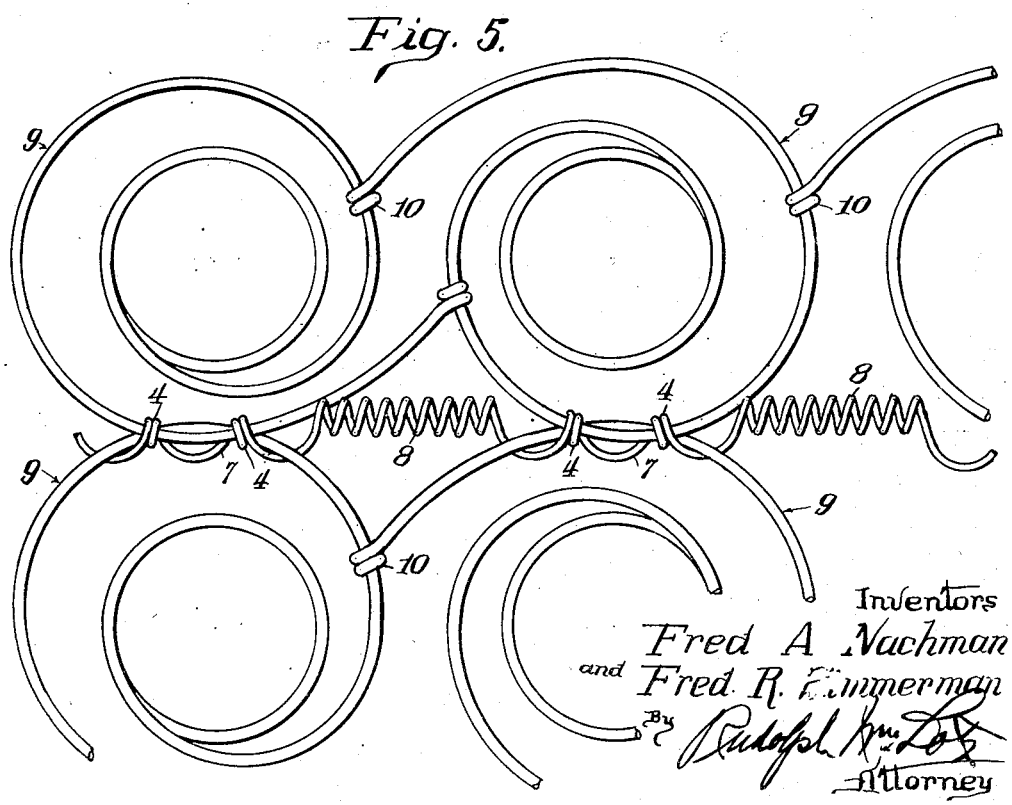
Inventors
Fred A. Nachman
and Fred R. Zimmerman
By Rudolph Wm. Lotz
Attorney Patented May 20, 1941

2,242,919

UNITED STATES PATENT OFFICE 2,242,919

SPRING ASSEMBLY FOR UPHOLSTERY

Fred A. Nachman and Fred R. Zimmerman,
Chicago, Ill.

Application April 5, 1939, Serial No. 266,047

1 Claim. (Cl. 5—267)

The present invention has for its object to provide a spring assembly for upholstery, wherein the component springs are suitably connected with each other in predetermined spaced relation to each other in a novel manner and by resilient means which will permit of a relative movement of sets of springs of the assembly toward and from each other in one direction.

A further object of the invention is to provide a spring assembly of the type specified, wherein the means employed for effecting coupling of the springs constitutes a conventional type of wire commonly employed in the upholstery art is substituted for upholstery springs, in one embodiment of the invention.

A further object of the invention is to provide means for producing spring assemblies of the all wire type, wherein the open or unknotted type of upholstery spring is employed and wherein the means or devices used for coupling the springs also acts to substantially effect knotting of the springs.

Other objects of the invention will be specifically pointed out in or readily understood from the following specification.

Suitable embodiments of the invention are illustrated in the accompanying drawings, wherein, Fig. 1 is a fragmentary, plan view illustrating a spring assembly composed of open or unknotted springs in combination with ties of a predetermined type in accordance with the invention.

Fig. 2 is a plan view showing a strip of the tie wire employed in the structure of Fig. 1.

Fig. 3 is a fragmentary cross-sectional view on an enlarged scale taken on the line 3—3 of Fig. 1.

Fig. 4 is a view similar to Fig. 1 showing a spring assembly of the same general type as that of Fig. 1, but wherein the knotted type of spring is used.

Fig. 5 is a view similar to Fig. 1 showing two rows of springs knotted to each other in a well known manner, and which are tied to each other in substantially the same manner as the springs of Figs. 1 and 4, but wherein the tie wire includes helical portions interposed between adjacent springs of the two rows thereof.

Fig. 6 is a fragmentary plan view similar to Fig. 2 showing the tie wire of Fig. 5 as it is produced preparatory to using the same in accordance with the disclosure of Fig. 5.

Fig. 7 is a fragmentary detail sectional view taken on the line 7—7 of Fig. 1.

In Fig. 1 there is shown a series of open or unknotted springs, the terminal coils of which are opposed to each other at one point, and wherein the next lower coil of the spring is disposed in contact with the lower faces of the contacting portions of the terminal coils. As shown in said Fig. 1, the terminal coil 1 of an upholstery spring is equipped at its extremity with an inwardly projecting bend 2 which bridges a point in the next succeeding lower coil 3 of the spring which is spaced from the coil 1 in the normal condition of the spring as conventionally made.

The portion of the terminal coil 1 of each of the springs shown at the top of Fig. 1, is substantially diametrically opposed to the extremity of the terminal coil which is brought into contact with a corresponding point in the coil 3 of each of the lower springs, all of which are of the hour-glass type.

When so disposed, the portion of the terminal coil of each of the lower springs adjacent the terminal bends 2 thereof, overlaps the coil 1 of the upholstery springs and these three grouped portions of the springs are then coupled in closely hugged relation to each other by means of ties 4. The said ties 4 comprise large portions of loops 5 of a conventional type of wire known commonly as zig-zag wire and used in the upholstery art. Said loops 5 are coiled about the grouped portions of the springs last-above described to securely couple them with each other without, however, interfering with their pivotal motion about the axes of the ties 4.

The component springs of the assembly may be spaced apart the distances determined by the spacing apart of the loops 5 of the zig-zag wire and in order to maintain the springs axially aligned with each other in each row thereof disposed horizontally of Fig. 1, the loops 5 coiled about the group portions of the springs to provide the ties 4 must always extend in the same direction. The purpose of the bend of each spring is to prevent rotation of the upholstery springs about their own axes and if said ties 4 are disposed at both ends of the upholstery springs, it is obvious, that while the bends 2 shown in Fig. 1 prevent rotation of the springs about their own axes in one direction only, the similar bends at the lower ends of the springs will prevent such rotation in the opposite direction.

The zig-zag wire loops interposed between the ties 4 obviously act as supports for padding etc, and also preserve the resiliency of the completed assembly and provide long life in that the bending stresses on the tie wires between the ties 4 are well distributed and thereby rendered negligible. These interposed loops 5 also possess the advantage of yieldingly maintaining the springs in their spaced apart relation and permit the spring assembly to be expanded or contracted in the general direction of said tie wires as by forcibly contracting or expanding one or several of the loops 5 disposed between contiguous ties 4.

The advantage of the structure lies largely in eliminating the operation of first knotting the upholstery springs and then assembling them, the forming of the bends 2 being done by operators usually immediately following completion of each tie 4.

In the embodiment of the invention shown in Fig. 4, knotted springs 6 are employed in place of unknotted springs shown in Fig. 1, the structure being otherwise identical with the structure of Fig. 1, except that the ties 4 embrace only the terminal coils of the springs or two wires each.

In Fig. 6 there is shown a type of tie wire wherein the loops 7 adapted to be coiled about the springs forming ties like the ties 4 of Fig. 1, are interposed between the ends of helical links 8 of the wire, the advantage of said portions 8 over the zig-zag wire shown in Figs. 1, 2 and 4 being that they are more flexible in one direction than the said zig-zag wires.

The wires 7—8 may, of course, be used in place of the zig-zag wires of Figs. 1 and 4 without departing from the invention.

Fig. 5 shows two rows of springs 9 which are knotted to each other by means of the terminal knots 10 at the extremities of the terminal coils thereof in a conventional manner to provide an articulate row of springs. The two rows are disposed so that the terminal coils of the springs of one row overlap the terminal coils of the spring of the adjacent row, the loops 7 of the tie wire being then coiled about these overlapped portions of the terminal coils to tie the rows of springs together, the helical portions 8 of tie wires being then disposed in the open spaces formed between or bordered by terminal coils of four springs in each instance. The said helical portions 8, therefore, constitute fillers for the open spaces to support padding material yieldingly and possesses the further advantage of yielding substantially inwardly to stresses imposed thereupon.

In the instance of tie wire shown in Fig. 6, the helical portions 8 will be spaced from each other a distance determined by the spacing apart of the upholstery springs of the assembly, as will also be true of loop 7, it being obvious that the ends of the helical portions 8 may be spaced further from the loops 7 than shown, in order to prevent any overlap of the portions 8 upon the upholstery springs spaced from each other a distance determined by the loops 7.

In the instance of tie wire of Fig. 6, as also in the case of the zig-zag wire of Figs. 1 and 4, each of the loops 7 constituting a tie 4 when coiled about the springs, is bordered by oppositely disposed loops which are provided for clamping purposes to hold them rigid while the loops 7 are being coiled to form the ties 4.

The resulting spring assemblies are very advantageous from the standpoint of low cost, durability and efficiency.

We claim as our invention:

A spring assembly for upholstery comprising a series of parallel rows of upholstery springs with the terminal coils of the springs of one row disposed in overlapped relation to the springs of an adjacent row or rows thereof, a series of flat sinuous wire springs having alternately oppositely disposed equal bends equally spaced apart disposed in part in overlapping relation to the overlapped portions of the terminal coils of springs of the several rows thereof with said overlapped portions of said springs disposed between the side edges of the sinuous springs, the upholstery springs of each row being spaced apart a distance equal to the spacing apart of a predetermined number of the bends of the said sinuous springs, median lines of the last-named bends lying in transverse vertical planes of the axes of opposed springs of the two rows overlapped by one of said sinuous springs, said bends of the latter aligned with said planes being coiled about said overlapped terminal coils of the springs of two of said rows to couple the same, the spacing apart of said bends of said sinuous springs constituting a means for fixing and varying the spacing apart of the springs of the several rows of the latter, the portions of the sinuous springs disposed between the bends thereof which are coiled about and couple the springs of one row with those of another affording resilient connections between opposed pairs of springs of two contiguous rows of the latter.

FRED A. NACHMAN.
FRED R. ZIMMERMAN.